//c// United States Patent [19]

King et al.

[11] 3,826,578
[45] July 30, 1974

[54] SCANNING INSPECTION SYSTEM AND METHOD
[75] Inventors: Gordon J. King; George Gugliotta, both of Ridgefield, Conn.
[73] Assignee: Laser Sciences, Inc., Bethel, Conn.
[22] Filed: Dec. 8, 1972
[21] Appl. No.: 313,328

[52] U.S. Cl.................... 356/237, 350/7, 350/285
[51] Int. Cl. ......................................... G01n 21/32
[58] Field of Search ....... 356/23, 24, 209, 199, 200, 356/203, 237; 350/6, 285, 7

[56] References Cited
UNITED STATES PATENTS
3,360,659   12/1967   Young ................................. 356/24
3,515,488    6/1970   Houser................................ 356/200
3,719,780    3/1973   Gazard et al. ........................ 350/6

Primary Examiner—William L. Sikes

[57] ABSTRACT

A small cross-sectional beam of radiant energy from a source such as a laser is directed by way of an optical scanning device onto a surface to be inspected. The intensity of the radiant energy reflected from the surface of the object is measured to determine the quality of the surface. The intensity may be equalized by focusing the reflected energy and providing aperture means so located that energy from mid-scan areas passes through the equalizing means relatively unimpeded to be measured while energy from points closer to the mid-scan point is intercepted to a greater degree. If the surface to be inspected is moving in a direction having a component perpendicular to the direction in which the beam is deflected by the scanning device, the scanning device need only deflect the beam in one plane. If the object is stationary, the scanning device may include two deflecting means in tandem, one deflecting the radiant energy beam in one direction and the other deflecting it in a perpendicular direction.

4 Claims, 10 Drawing Figures

PATENTED JUL 30 1974

SCANNING INSPECTION SYSTEM AND METHOD

BACKGROUND OF THE INVENTION

This invention relates to the field of optically scanning a surface to be inspected by means of a concentrated beam of radiant energy, such as a laser beam deflected in one or two directions across the surface to be inspected, and a system including means to measure the reflected radiant energy to determine the quality of the surface.

One of the objects of the present invention is to measure the quality of the surface of an object to detect the existence and relative frequency of occurrence of cracks, holes, protuberances, uneven sections, dirt spots, contamination, unduly rough or shiny areas, and other flaws that affect the reflectivity of the surface.

In accordance with the present invention, a concentrated beam of radiant energy, such as from a laser, is directed along an optical axis and onto the surface to be inspected and is deflected by a scanning device so that it will trace out a line made up of points on that surface. At each point some of the radiant energy, or light, will be reflected more or less diffusely by the surface. Photo-responsive means are located so as to receive the reflected light within a certain solid angle to generate an electrical signal that has an amplitude corresponding to the intensity of the diffusely reflected light and can be used to indicate the quality of the surface and to facilitate rejection of the object if the quality is below a pre-determined level due to flaws.

The scanning may be accomplished by directing the beam upon a scanning device to cause the beam to be deflected transversely through a predetermined angle. This causes the beam to trace out a line on the surface of the object being inspected. If the object is simultaneously moved in a direction having a component perpendicular to the direction of scanning movement of the spot along the surface, the entire surface area facing the beam may be scanned for inspection even though the beam is deflected to trace out only one line. In fact, by extending the scanning beyond each end of the object and onto mirrors that reflect the beam to other surfaces not in a direct line of sight of the scanning device, such other surfaces may also be inspected.

Various types of scanning devices may be used, such as a rotating prism or pyramid or an oscillating mirror, to deflect the beam. Two of these scanning devices may be used in tandem to deflect the beam in two directions to trace out a raster of lines on the surface to be inspected if the object being inspected is stationary during the inspection process.

The reflected radiation may be gathered by a lens and concentrated on the photo-responsive surface of a photocell or the like to produce an electrical signal to determine the quality of the surface under inspection. In order to equalize the intensity of light reflected from the surface under inspection when the laser beam is at or near ends of its range of travel, the lens through which the reflected radiation passes may be arranged to focus, at an image plane, an image of the point of impact of the beam upon the surface being inspected. The distance between the central plane of the lens and the image plane is a function of the distance along the optical path between the central plane of the lens and the point at which the beam strikes the surface. This optical path is shortest when the scanning device is in a neutral position so that the beam is not being deflected and is longest when the beam is being deflected to its greatest extent. Therefore, the image plane moves through a range of axial positions as the beam is deflected from side to side. An optical aperture structure may be placed at or near the image plane corresponding to the most distant scanned point on the surface being inspected to intercept some of the light rays from the point illuminated by the beam on the neutral axis. In this way the intensity of light reaching the photocell may be made relatively independent of deflection of the beam. The equalization of energy relative to deflection may be improved by directing the reflected light back along the optical axis to the scanning device and then through the lens to the aperture structure.

DETAILED DESCRIPTION OF THE INVENTION

Figure 1:
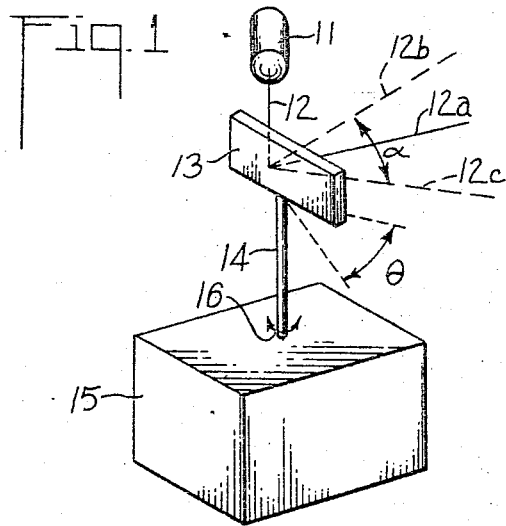
FIG. 1 is a perspective view of a simplified oscillating mirror scanning device such as may be used in the present invention.

In FIG. 1 a source 11, such as a laser, generates a collimated and bright radiant energy beam 12. This beam strikes the reflective surface of a mirror 13 mounted on a support 14 that is attached to an actuator 15 that causes the support 14 and the mirror 13 to pivot back and forth through an angle $\theta$, as indicated by an arrow 16. The reflected beams 12a sweeps back and forth between limiting position 12b and 12c separated by an angle $\alpha$ where $\alpha = 2\theta$. The actuator 15 may be a well known, electrically driven galvanometer movement.

One of the disadvantages of the structure in FIG. 1 is that the stress placed on the moving parts increases both with the frequency of oscillation and the angle $\theta$. As a result, this embodiment is limited in its ability to provide high frequency and high amplitude deflection simultaneously.

Figure 2:
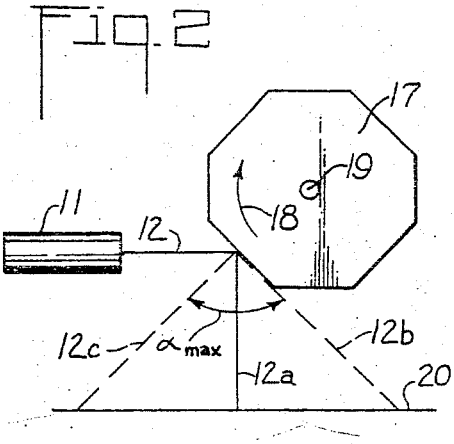
FIG. 2 is a side view of a polygonal reflecting scanner of a type that may be used in the present invention.

FIG. 2 shows another scanning device 17 in the form of a polygonal cylinder in which the beam-deflecting surfaces always move in one direction and therefore are not subjected to the stress that accompanies rapid changes of direction as encountered in the oscillatory structure in FIG. 1. In the embodiment in FIG. 2 the cylinder has eight equal sides, each of which, in turn, rotates into position to be struck by the beam 12 and to reflect it as a reflected beam 12a. As the polygonal cylinder 17 rotates continuously in one direction, which is here indicated by the arrow 18 as being clockwise but could just as well be counterclockwise, the beam 12 from the source 11, which is directed at a point below the axis 19 of the cylinder, is deflected through an angle $\alpha$ that has a maximum value of 720°/N, in which N is the number of sides of the cylinder. Since N in this case is 8, the maximum value of $\alpha$ is 90°. The reflected beam 12a is swept from one limiting position 12b to the opposite limiting position 12c to trace out a straight line on a surface 20 while the cylinder 17 is rotating. In the case of an 8-sided prism the limiting positions are 90° apart, and the beam 12a is deflected through this angle while the cylinder is rotating 45°. When the cylinder 17 has rotated slightly more than 45°, the reflected beam 12a starts to trace out the same line over again from the position 12b.

Figure 3A:
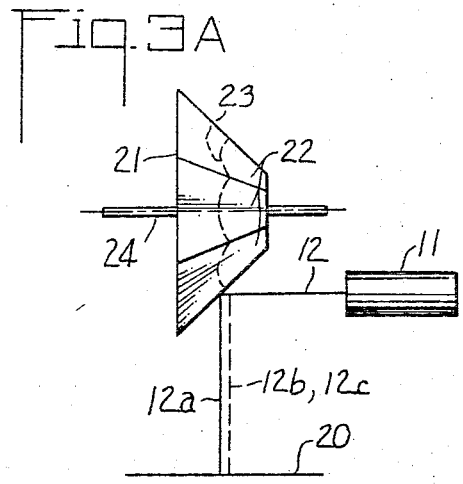
FIG. 3A is a side view of a pyramidal scanning device and FIG. 3B is an axial view of the same device suitable for use in the present invention.

FIG. 3a shows a pyramidal scanning device 21 having a plurality of facets 22, each located at an angle with respect to the axis 24 of the pyramid. In this embodiment the angle is 45°, although other angles can also be used. The beam 12 from the source 11 directed parallel to the axis of the pyramid strikes these facets 22 and is reflected by them. Since the angle is 45° in this embodiment, the beam is reflected perpendicular to its initial direction. As the pyramid 21 rotates, the point at which the beam 12 intercepts each of the surfaces of the facets 22 traces out the same locus that would be obtained by the intercept between the pyramid and a right circular cylinder having a radius equal to the distance between the axis of the pyramid and the path of the incident beam 12. From the side view in FIG. 3A, this intercept has a scalloped appearance as indicated by the broken line 23. Thus, as the pyramid 21 rotates, the reflected beam 12a directed perpendicular to the incident beam appears to shift back and forth slightly by a distance equal to the axial height of each of the scallops of the line 23.

Figure 3B:
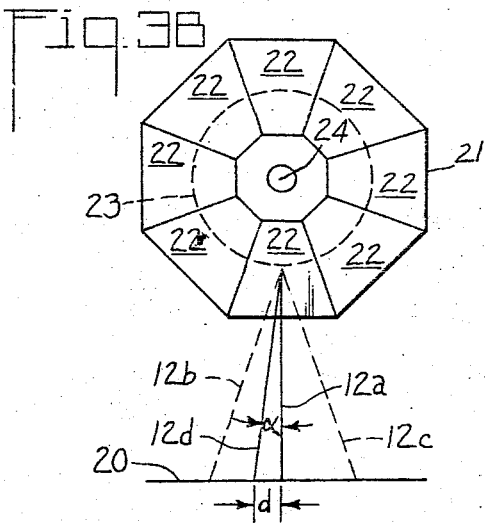

When the pyramid 21 is viewed directly along its axis, as shown in FIG. 3B, the line 23 appears to be a circle. In addition, the reflected beam 12a appears to be deflected from one limiting position 12b to the other limiting position 12c as the pyramid 21 rotates. The maximum angle, $\alpha_{max}$, of this deflection is equal to 360°/N in which N is the number of facets 22. In the pyramid 21 illustrated, there are eight such facets and thus the maximum angle of deflection is 45°, which is equal to the included angle of each of the facets. The combination of the side-to-side deflection illustrated in FIG. 3B and the simultaneous back and forth deflection illustrated in FIG. 3A causes the reflected beam 12a to trace out a curved line on the surface 20. However, with eight facets, the curvature of the line, which is a circular arc, is not great and would be even less with more facets. In addition, the distance $d$ that the reflected beam 12a is deflected when the pyramid 21 is rotated by an angle $\alpha$ from the position 12a of a zero deflection to the position 12d is given by the equation $d = h \tan \alpha$, in which $h$ is the distance in the mid-scan direction from the point of intersection of the beam 12 on a facet 22 to the surface 20. For small values of the angle $\alpha$, this is almost linear, and in the case of an eight-sided pyramid, the maximum deflection angle, $\alpha_{max}$, can be only ±22½° since the total deflection is limited to 45°.

Figure 4:
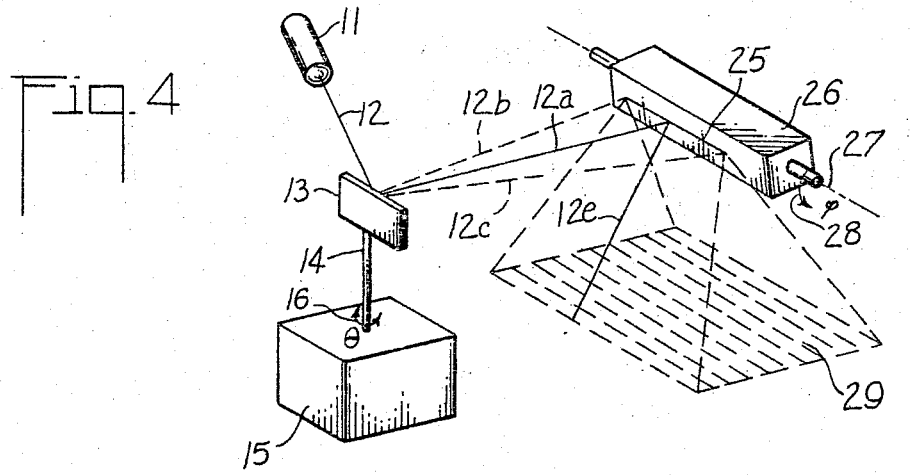
FIG. 4 is a simplified perspective view of a scanning device for scanning an area in accordance with the present invention.

The foregoing scanning devices are capable of tracing out only a single line on a surface. FIG. 4 shows a structure for tracing out a rectangular area. In this case, the source 11 directs its beam 12 at the reflective surface of the mirror 13 mounted on the support 14 and oscillated by the actuator 15, in the same manner as show in FIG. 1. The reflected beam 12a, which oscillates between the positions 12b and 12c, traces out a straight line 25 that intercepts a polygonal cylinder 26 which rotates on an axis 27, as indicated by the arrow 28. All of the surfaces of the cylinder 26 are reflective and as this cylinder rotates, the image of the line 25 scans a rectangular area 29. By causing the actuator 15 to deflect the beam 12a back and forth between the limits 12b and 12c much more rapidly than the cylinder 26 causes the image of the line 25 to scan across the area 29, the area 29 is, in effect, scanned by a series of parallel lines formed by the twice-reflected beam 12e. The relative scanning rates produced by the mirror 13 pivoting back and forth through the angle $\theta$ much faster than the cylinder 26 rotates through an angle $\phi$ are such that adjacent lines in the raster area 29 may be packed as densely as desired so that every part of the surface within the area 29 is struck by the beam 12e.

The production of a scanning action of the beam is only one part of the inspection system of the present invention. In the complete structure shown in FIGS. 5 and 6, means are also illustrated for measuring the intensity of light reflected from the surface scanned by the beam.

The inspection apparatus includes the laser 11 that directs its collimated beam of radiation 12 onto a first mirror 30. This mirror is supported in a frame 31 which also carries a lens 32. A channel 33, which has a right-angle bend in it at the mirror 30, permits the reflected beam 12f to pass through the frame 31. The frame 31 has an open space 34 to permit the passage of more of the reflected light, as will be described hereinafter. On the other side of the open space 34 is a post 35 that has a short right-angle channel 36 extending through it and a mirror 37 supported at a 45° angle to reflect the beam 12f along the optical beam path 12g, which is perpendicular to the line of travel from the mirror 30 to the mirror 37.

A pyramidal scanning device 21, which is illustrated as being similar to that in FIGS. 3A and 3B, is locatd in the optical path of the beam 12g reflected from the surface of the mirror 37. Each of the facets 22 is at an angle of 45° to the axis of the pyramid 21, and each of the facets has a reflective surface that absorbs as little of the beam 12g as possible and reflects as much as possible along a beam direction 12h. The pyramid 21 is rotatably mounted in a structure 41 and is driven by a belt 42 which, in turn, is driven by a pulley 43 attached to a motor 44.

Figure 6:
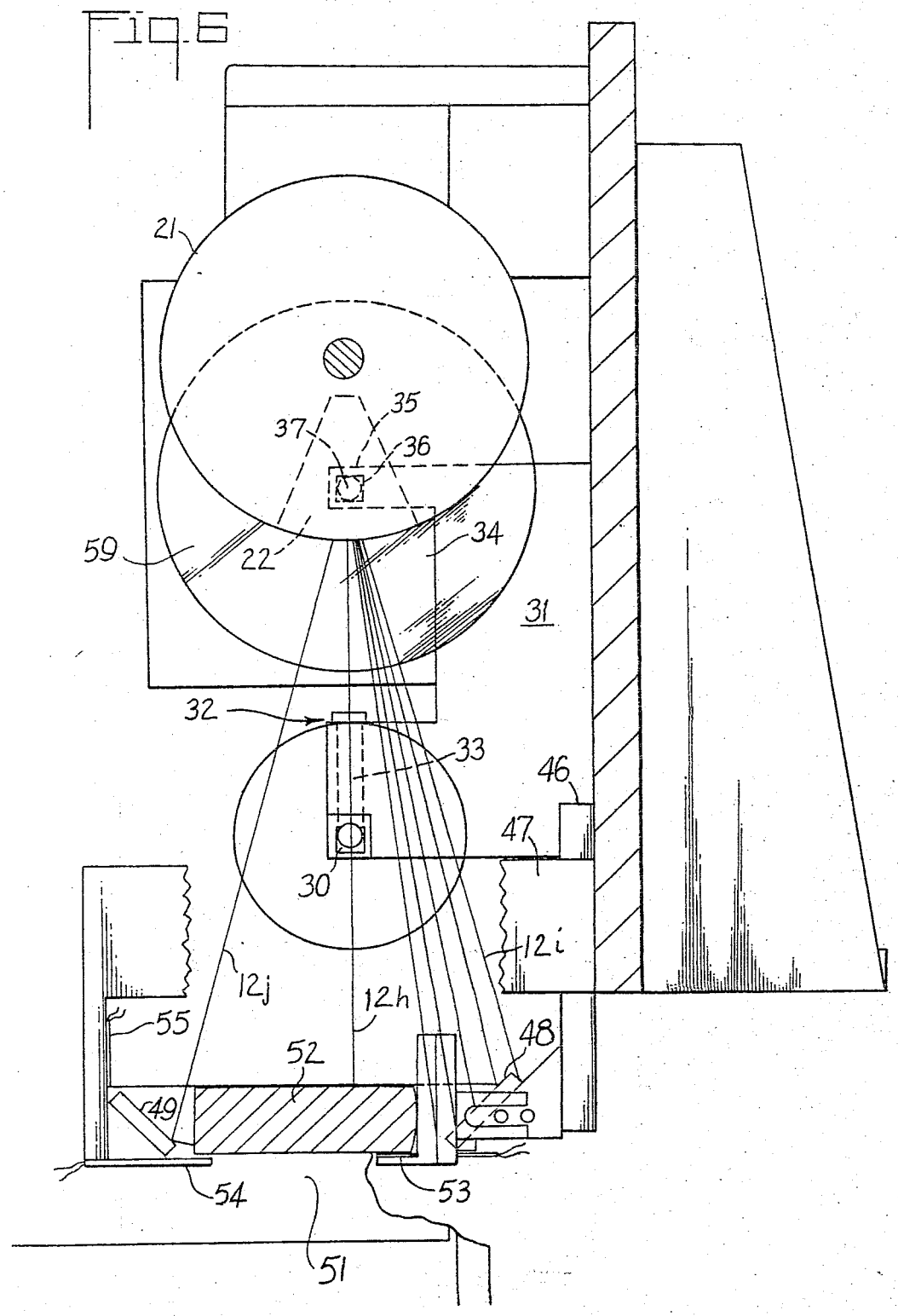
FIG. 6 is a cross-sectional view of the system of FIG. 5 along the line 6—6' in FIG. 5.

Two brackets 46 and 47, shown particularly in FIG. 6, support a pair of mirrors 48 and 49 on each side of a base 51 on which an object 52, the surface of which is to be inspected, is located. The object 52 is not described in detail because it need not be of any specific size or shape provided only that the brackets 46 and 47 are made large enough to accommodate it and that the scanning angle of the beam 12h deflected by the facets 22 of the pyramid 21 cover the surface to be inspected.

It is also preferable to move the object 52 through the scanning location smoothly and at a suitable speed, but transport means to accomplish this result are well known and need not be described in detail. In addition to the mirrors 48 and 49, the brackets 46 and 47 support three photo-sensitive devices 53–55 which are used in determining the location of the object 52 within the field of the scanning beam 12h, as will be described hereinafter.

The light from the laser beam 12h striking the surface of the object 52 will be reflected in a diffused pattern. If the surface of the object 52 were a perfect, or Lambertian, diffuser, the reflected light per unit area of the surface to be inspected would be given by $I_o \cos \Psi$, where $\Psi$ is the angle of the reflected ray relative to the normal to the surface undergoing inspection and $I_o$ is the intensity of the light in a direction perpendicular to the surface. The locus of points of equal reflected intensity for such a perfect Lambertian diffuser would be a sphere tangent to the surface of the object 52.

It is to be expected that the actual surface under investigation would not be a perfect diffuser and would tend to reflect a greater intensity of light in a general direction back along the direction of the scanning beam 12h. However, the intensity would be further modified by scratches or dark spots or any other flaws, including any excessively rough or shiny spots, on the surface of the object 52. Thus, it is preferable to measure the intensity of reflected light in a solid angle surrounding the path of the beam 12h. Such a solid angle is determined by the configuration of each of the facets 22 of the scanning device 21. The outer limits of the light to be measured are indicated by the edge rays 57 and 58, which are indicative of the reflective rays that strike the perimeter of each of the facets 22 and are reflected by these facets. The entire bundle of reflected light rays within this solid angle is then directed toward a lens 59, although some of the rays are intercepted by the post 34. However, a substantial part of the reflected light is concentrated by the lens 59 and passes through an aperture stop structure 61. Thereafter, the reflected light is directed through a color filter 62 that attenuates light having a different color than is emitted by the laser 11. After passing through the color filter 62, the light reaches the photo-sensitive surface of a phototube 63, which produces an electrical signal having an amplitude that corresponds to the intensity of the light that strikes that surface.

Figure 5:
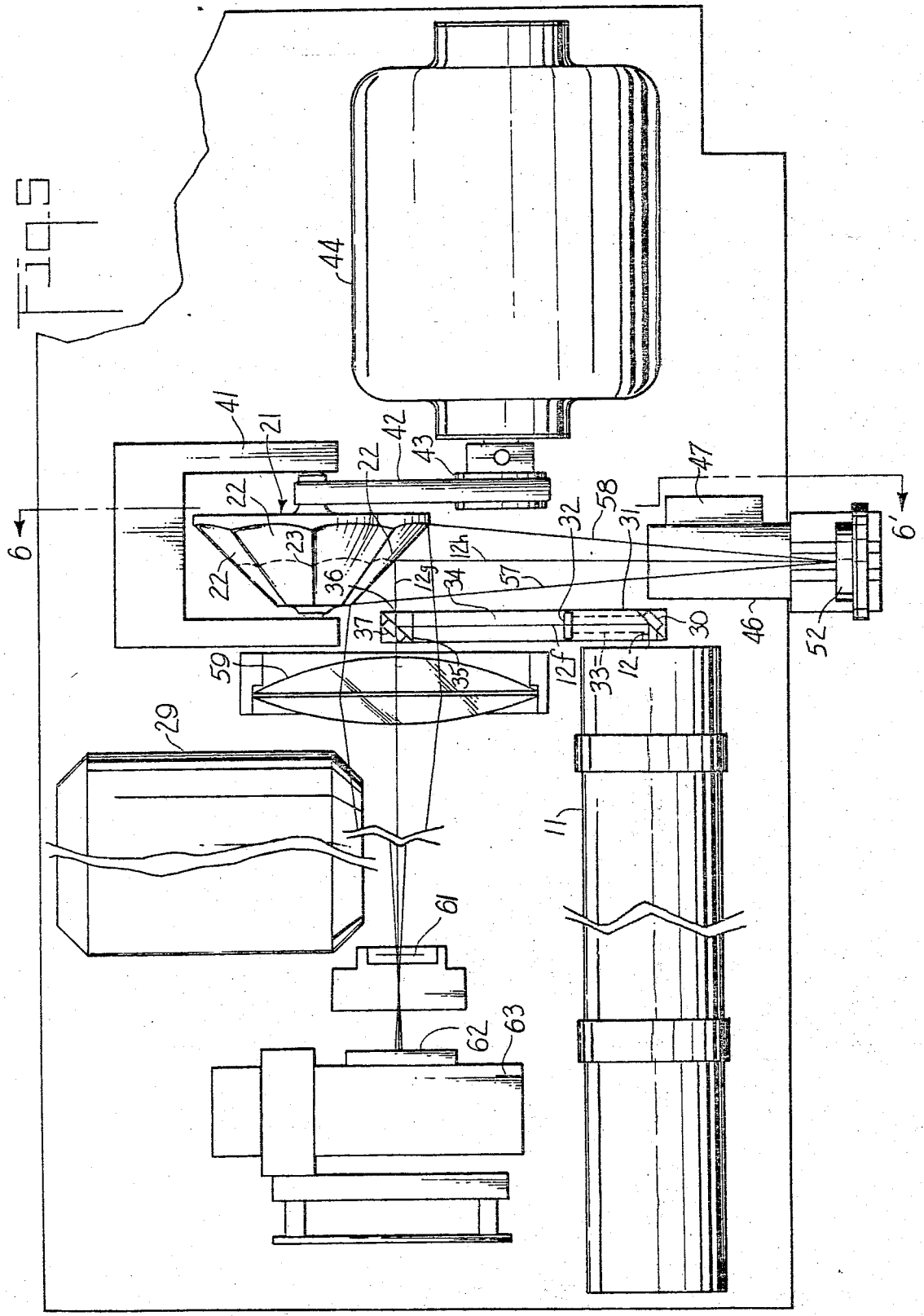
FIG. 5 is a front elevational view of a complete scanning system in accordance with the present invention.
Figure 7:
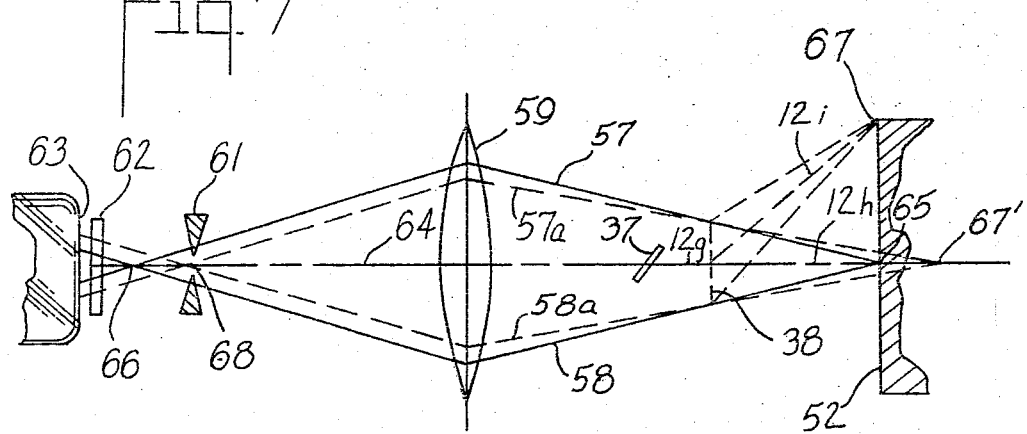
FIG. 7 is an optical diagram showing one arrangement of an equalizing aperture in a scanning system according to the present invention.

FIG. 7 is an optical diagram of the reflected light in the apparatus of FIGS. 5 and 6. The pyramidal scanning device 21 is illustrated in this optical diagram merely as a dotted line perpendicular to the axis to indicate that the beam 12g, which is reflected from the mirror 37, is deflected at the location of the pyramid 21 and becomes the beam 12h. The beam 12h, which has such a small cross-section as to be virtually a point of light, is deflected transversely across the surface of the object 52 by means of the pyramid 21.

This scanning beam goes from a mid-scan position, which corresponds to no deflection by the pyramid 21, to a position 12i, which corresponds to maximum deflection across the surface of the object 52 by operation of the pyramid 21. The beam is also deflected from the other side to the mid-scan position, but it is not necessary to show this in the optical diagram.

The lens 59 will focus any point far enough to its right along the optical axis 64 at some image point also on the optical axis 64 but to the left of the lens. Thus, the infinitesimal area 65 where the undeflected beam 12 strikes the surface of the object 52, will be focused at a point 66 on the optical axis 64 to the left of the lens 59. Since, as is shown in FIG. 5, all of the reflected light reaching the lens 59 must first be reflected from the pyramid 21, the intensity of illumination concentrated at the image point 66 is a measure of the reflected light energy within the solid angle bounded by the rays 57 and 58. This solid angle has the same perimeter as one of the facets 22 as shown in FIG. 6.

When the pyramid 21 deflects the laser beam to the position 12i to illuminate a point 67 on the surface of the object 52, the light diffusely reflected from this point will also be focused on the axis 64 by the lens 59. The reason is that, as may be seen in FIG. 5, the pyramid 21 reflects the diffuse, reflected light from the surface of the object 52 in the same way that it reflects the incident light on the path 12g. Therefore, to the lens 59, light from the point 67 appears to be on the axis 64. However, the point 67 is located at a greater distance from the central plane of the lens 59 than is the point 65. Therefore, it will be focused by the lens 59 at a point 68 determined by the laws of optics and closer to the lens 59 than the point 66. Since the beam illuminates only an infinitesimal area, whether it is the point 65 or the point 67, all of the rays from either of these points will be focused by the lens 59 in a very concentrated bundle at corresponding points on the axis 64, i.e., the point 66 corresponding to the point 65 or the point 68 corresponding to the point 67.

Since the point 67 is farther removed from the lens 59 than is the point 65, it would be equivalent to a point 67' the same distance from the pyramid 21 but located to the right of the point 65 on the axis 64. All of the reflected light from the point 67' must also reach the lens 59 by way of one of the facets 22 at a time, but since the point 67' is farther away from the pyramid 21, the subtended angle will be smaller than in the case of light reflected from the point 65. Partly for this reason, and partly because of the fact that the diffusion characteristics of the surface of the object 52 are less than perfectly Lambertian, the intensity of light reaching the surface of the phototube 63 from the point 67 will be less than that reaching the phototube 63 from the point 65.

In order to equalize the intensity of light that energizes the phototube 63, whether that light comes from the point 65 corresponding to an undeflected beam 12h or from the point 67 corresponding to the deflected beam 12i, the present invention provides an aperture structure that intercepts some of the light rays from the axial point 65 but less, or none, of the rays from the most remote off-axis point 67. This is accomplished by placing the aperture 61 substantially at the image plane of the point 68 corresponding to the most distant point 67 to be inspected. As may be seen, all of the reflected light from this most distant point 67 within the angle bounded by the rays 57a and 58a, passes through the aperture 61 without interference. However, the outer rays of light from the axial point 65 are intercepted by the opaque portions of the aperture 61, thus cutting down on the intensity of axial light reaching the phototube 63. The relationship between the intensities of light from the points 65 and 67 may thus be equalized by proper choice of the axial location of the aperture 61 and the size of the transparent or open area thereof.

Figure 8:
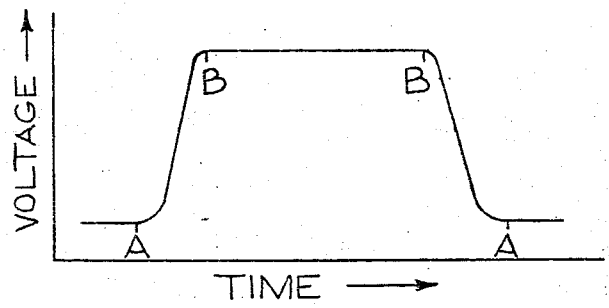
FIG. 8 illustrates a signal generated by scanning beyond the edges of a surface being inspected.

In many instances it is not convenient to arrange the scanning apparatus so that the beam will be deflected precisely over the part of the surface that is to be inspected and will not go beyond that surface. It is usually desirable to have the beam be deflected farther than is necessary, but this means that the beam may then cause a reflection of light from surfaces other than the intended surface. The structure shown in FIGS. 5 and 6 provides means for eliminating spurious signals caused by such passage of the beam beyond the surface of the object 52. Such means include the photocells 53-55 which are placed so that, if the beam, in reaching the positions 12i and 12j of maximum deflection, passes beyond the limits of the object 52, it will strike one or another of these photocells and will generate a signal. FIG. 8 shows a signal of the type that may be generated by such photocells and FIG. 9 shows the circuit in which that signal, as well as the inspection signal, may be generated.

Figure 9:
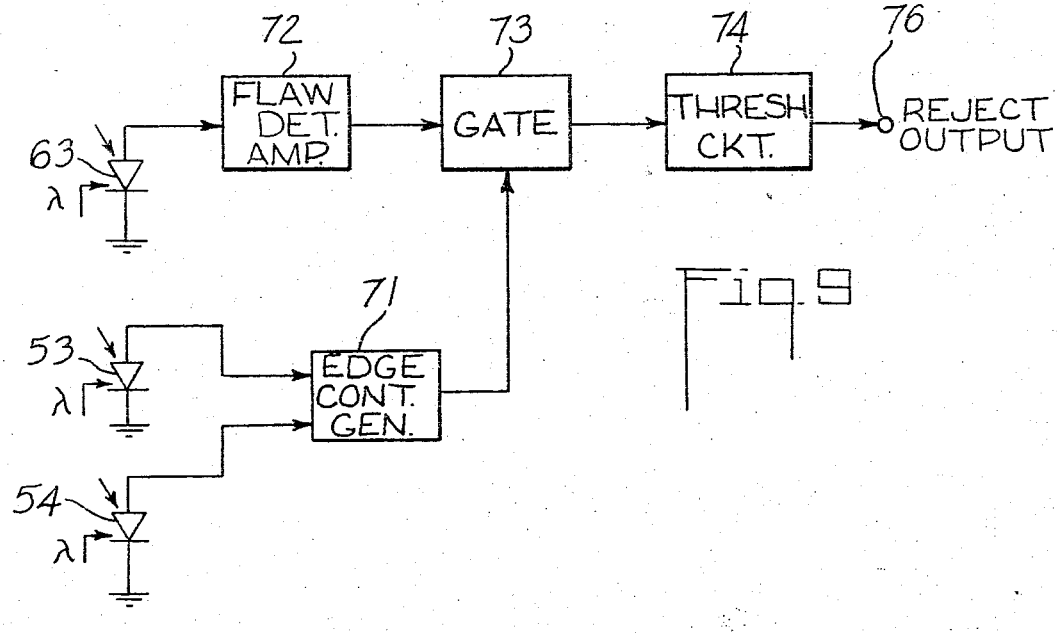
FIG. 9 is a block diagram of an electrical circuit in which a signal of the type shown in FIG. 8 is generated and used to locate the position of the object being inspected.

In FIG. 9, the photocells 53 and 54 are connected to a circuit 71 which is referred to as an edge control generator, since it generates a signal that has leading and lagging edges determined by the edges of the object to be inspected. The flaw detection phototube 63 is connected to a flaw detection amplifier 72, the output of which is connected to a gate circuit 73. The output of the edge control generator is also connected to the gate circuit 73 as a gating signal to control the passage of the flaw detection signal through the gate circuit. A threshold detection circuit 74 is connected to the output of the gate circuit, and an output terminal 76 of the threshold detection circuit 74 is the terminal from which a reject signal is obtained.

Initially, as the beam is deflected, it will strike one of the photocells 53 or 54 and will generate a signal represented by the low voltage portion at the left-hand side of FIG. 8. To make the description specific, it will be assumed that the beam initially is deflected along the path 12j and strikes the photocell 54. As the beam is deflected from the maximum deflection position to a more central location, it will pass across the boundary of the object 52. Between the points A and B the beam goes from a position in which it is entirely directed upon the photocell 54 to a position in which none of the beam reaches the photocell 54. This causes the output voltage level of the edge control generator circuit 71 to generate a voltage which is represented in FIG. 8 as being in the positive direction. This voltage is maintained at a "high" level until the beam is deflected nearly to the other maximum deflection location 12i.

As the beam reaches the opposite edge of the object 52, it begins to strike the photocell 53 and causes the voltage output circuit 71 to drop. Thus, the output signal of the circuit 71 is a pulse that is suitable for use as a gating signal for the gate 73.

The flaw detection photocell, or phototube, 63 translates any light that reaches it into an electrical signal. However, only the light that reaches it while the beam is scanning the surface of the object 52 represents the proper analyzing light. Using the output signal shown in FIG. 8 and produced by the edge control generator circuit 71, the gate circuit 73 may be controlled to permit the output signal of the flaw detection amplifier 72 to reach the threshold detection circuit 74 only at proper times, no matter what the exact position of the object 52 may be while it is being scanned.

The threshold detection circuit simply measures the flaw detection signal that passes through the gate 73 and compares this measurement with a previously set standard. If the reflected light from the surface of the object 52 is too low, indicating a crack, rough spot or some other unacceptable surface condition, or is too high, indicating an unacceptably bright or smooth surface area, a reject output signal will be generated and can be taken from the output terminal 76 to operate a warning device or a device that will actually remove the defective object 72 from the inspection line.

What is claimed is:

1. Apparatus for inspecting the surface of an object located generally at an inspection position, the exact dimensions and location of the object being undetermined, said apparatus comprising:
   a. means for generating a collimated beam of radiant energy;
   b. a scanner for scanning said beam across the inspection position;
   c. a first photodetector positioned to receive radiant energy reflected from the inspection position;
   d. second and third photodetectors located at the inspection position and positioned to receive the beam at its opposite scanning extremes, said second and third photodetectors being spaced sufficiently close together such that an object at the scanning position partially overlaps both of said second and third photodetectors;
   e. means responsive to the outputs of said second and third photodetectors for generating an edge control signal; and
   f. inspection signal generating means, gated by said edge control signal, for generating an inspection signal in response to the output of said first photodetector.

2. Apparatus as defined by claim 1 wherein said beam of radiant energy is a laser beam.

3. Apparatus as defined by claim 2 wherein said scanning means is an optical spinner.

4. Apparatus as defined by claim 3 further comprising a lens positioned to collect laser light energy reflected from said inspection position off said spinner as a solid angle of light surrounding the impinging laser beam, said first photodetector receiving the light collected by said lens.

* * * * *